United States Patent [19]

Kohler

[11] Patent Number: 5,379,881
[45] Date of Patent: Jan. 10, 1995

[54] STREAM SPLITTING APPARATUS
[75] Inventor: Gregory R. Kohler, Williamsport, Pa.
[73] Assignee: Andritz Sprout-Bauer, Inc., Muncy, Pa.
[21] Appl. No.: 231,118
[22] Filed: Apr. 22, 1994
[51] Int. Cl.⁶ .............................................. B65G 25/00
[52] U.S. Cl. .................................... 198/601; 198/642
[58] Field of Search ................................. 198/601, 642

[56] References Cited
U.S. PATENT DOCUMENTS

| | | | |
|---|---|---|---|
| 591,259 | 10/1897 | Koelner . | |
| 2,779,455 | 1/1957 | Sinclair | 198/642 |
| 2,916,997 | 12/1959 | Terrie . | |
| 2,956,503 | 10/1960 | Neidl . | |
| 3,136,254 | 6/1964 | Douglas . | |
| 3,441,227 | 4/1969 | Fisher | 241/247 |
| 3,467,302 | 9/1969 | Wilson | 230/270 |
| 3,640,474 | 2/1972 | Niedl | 241/46.02 |
| 3,773,432 | 11/1973 | Chow et al. | 415/152 A |
| 3,851,993 | 3/1974 | Foster . | |
| 3,860,035 | 1/1975 | Semple | 137/625.47 |
| 3,916,542 | 11/1975 | Blanchet | 198/642 |
| 3,920,116 | 11/1975 | Butler | 198/642 |
| 4,826,402 | 5/1989 | Nachtrieb | 415/206 |
| 4,883,406 | 11/1989 | Arnold | 198/642 |
| 5,102,297 | 4/1992 | Thompson | 415/206 |

FOREIGN PATENT DOCUMENTS 514077  9/1952  Belgium .
488639  1/1930  Germany .
84596   1/1954  Netherlands .

Primary Examiner—John T. Kwon
Attorney, Agent, or Firm—Chilton, Alix & Van Kirk

[57] ABSTRACT

An apparatus for splitting a stream of material into two or more streams. The apparatus includes a cylindrical housing with an axial inlet and two or more radial outlets which are axially spaced from each other. The apparatus includes an impeller which has a central shaft with a plurality of blades extending radially therefrom defining two or more sets of material receiving chambers. Each set of material receiving chambers has guide means directing any material which enters the chambers in that particular set outward through a specific outlet. Due to the rapid rotation of the impeller, each set of material receiving chambers receives material from the inlet at a predetermined ratio of flow rates relative, and guides that material outward through a particular outlet. The device is particularly useful for splitting a stream of particulate material into two separate streams having equal flow rates, even if the flow rate at the inlet to the stream splitter is inconsistent.

23 Claims, 6 Drawing Sheets

STREAM SPLITTING APPARATUS

BACKGROUND OF THE INVENTION

This invention relates generally to the flow of material, and more particularly to an apparatus for splitting a stream of material into two or more streams.

It is often desirable to split a stream of particulate material into two or more streams each having the same average flow rate. In the mechanical pulping industry, stream splitters are used in order to feed equal amounts of pulp or wood chips into each side of a central rotating disc in one type of refiner. When a stream splitter is used, it is important to feed equal quantities of material in each side of the refiner in order that the refiner operates at its maximum capacity. Furthermore, equal feed in each stream will provide for similar thrust and fiber development on each side of the refiner.

A typical stream splitter for a stream of particulate material has a Y-type divider blade. It is both difficult and expensive to achieve an equal split using this type of device, because in order to get equal flow to each side, the incoming stream either must be 100% full, or perfectly centered, with uniform material density and velocity throughout. Otherwise, the more densely packed or faster side of the "Y" receives more material than the other side.

It is known that a material stream can be accurately split by providing equal opposing discharge openings on a simple screw conveyor. However, in order for equal splitting to result, the following three conditions must be met. First, the screw must rotate fast enough for centrifugal force to keep the material on the barrel of the conveyor, in order to distribute it equally to both outlets. Second, the outlets must be exactly 180° apart. Third, any restriction to flow through the outlets must be the same for each outlet. If material encounters more resistance at one outlet or the other, the material will move to the outlet of least resistance, and the split will not be equal.

SUMMARY OF THE INVENTION

An object of the invention is to provide an apparatus and method for splitting a stream of material into two streams having equal volume flow rates.

Another object of the invention is to provide an apparatus and method for splitting a single feed stream into multiple streams which have predetermined average flow rate ratios relative to one another.

Another object of the invention is to provide a stream splitter which will operate consistently over a wide range of feed stream flow rates.

Yet another object of the invention is to provide an apparatus and method for efficiently splitting a stream of particulate material.

A further object of the invention is to provide a stream splitting apparatus which has a relatively simple design.

Other objects will be in part obvious and in part pointed out more in detail hereinafter.

The invention in a preferred apparatus form includes a stationary housing having a first wall with a material inlet for receiving a stream of conveyed material, an opposite second wall, a side wall connecting the first and second walls, and axially spaced first and second material outlets. The housing contains an impeller which includes a central shaft and a plurality of blades extending radially from the shaft defining therebetween and with the first, second, and side walls at least two different sets of material receiving chambers in the housing. The first and second sets of material receiving chambers are configured to receive material at a predetermined ratio of average overall flow rates from the material inlet. Preferably, the first and second sets of material receiving chambers receive equivalent average volume flow rates. The impeller also includes guide means in the plurality of material of receiving chambers for guiding material in the first set of material receiving chambers through only the first material outlet, and for guiding material in the second set of material receiving chambers through only the second material outlet, as the impeller rotates. The apparatus also includes drive means on the shaft for attachment to a source for rotationally driving the impeller.

Each set of material receiving chambers constitutes at least one material receiving chamber. In a particularly preferred form, the blades define at least four material receiving chambers of approximately equal size, i.e. two sets of material receiving chambers, each of which includes two chambers. In this case, the first set of material receiving chambers preferably consists of a pair of non-adjacent material receiving chambers. Preferably, although not necessarily, the blades form an even number of material receiving chambers in the housing.

In a particularly preferred form, each guide means comprises a frustoconical segment. This configuration facilitates smooth flow of the material through the impeller.

Each blade in the impeller preferably includes a generally rectangular inner portion connected to the shaft and a co-planer, trapezoidal outer portion which diverges from the rectangular inner portion.

Each guide means preferably has a pair of opposite terminal edges connected to the outer portions of adjacent blades. The terminal edges are mounted diagonally on the outer portions of the blades relative to the axis of the housing, at an angle of about 45°-60° relative to the axis of the housing.

In a preferred construction of the apparatus, each guide means also includes a pie-shaped segment opposite to the inlet opening in the housing. The pie-shaped segment is part of a flat, circular segment which is coaxial with the impeller shaft and abuts both the downstream edge of the inner portion of each blade and the downstream edges of the frustoconical segments in the material receiving chambers which direct material out the first outlet. The pie-shaped segments also facilitate smooth flow of the material through the impeller.

Another preferred form of the invention is a method of splitting a stream of material into at least two streams having a predetermined ratio of volume flow rates. The method comprises feeding the material into a stream splitting apparatus of the type described above.

The invention accordingly comprises the several steps and the relation of one or more of such steps with respect to each of the others and the article possessing the features, properties, and the relation of elements described in the following detailed disclosure.

DETAILED DESCRIPTION OF THE PREFERRED EMBODIMENT

Figure 1:
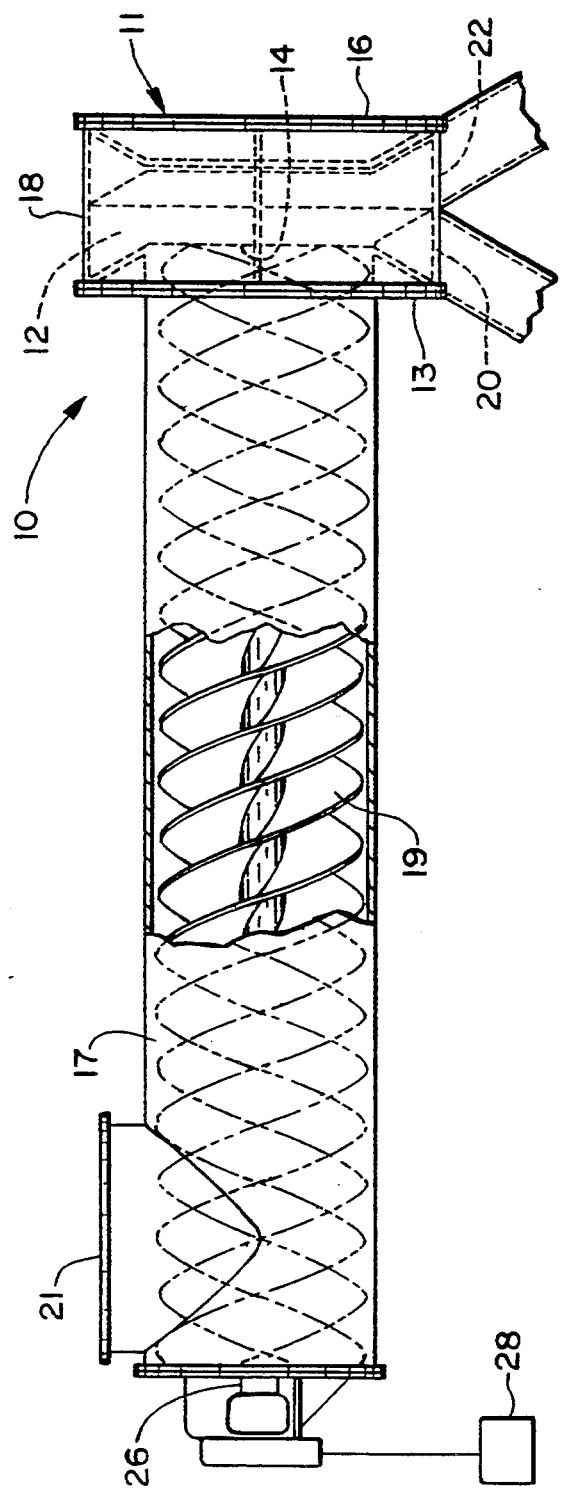
FIG. 1 is a side view of the housing for a first embodiment of a stream splitting apparatus of the invention, showing a single material inlet to a screw-type feeder and two axially spaced material outlets, and showing an impeller in phantom.

Referring now to the drawings and in particular to FIGS. 1-4, a first embodiment of a stream splitting apparatus is shown and is designated as 10. The stream splitter includes an impeller 12 having a housing 11 which has a cylindrical outer shape and has indented front and back walls 13, 16, respectively which conform to the shape of the impeller 12, which is disposed therein. The front wall 13 has a central, axial inlet 14 for introducing material into the housing in an axial direction. The back wall has the shape of a pie plate. The inlet 14 is fluidly connected to a horizontal screw-type feeder 17 having four equally spaced flights 19, the end of each flight 19 being welded or otherwise attached to the impeller 12 in a manner which is further described below, in order that the screw conveyor 17 and impeller 12 rotate at the same rate. Other types of feeders also can be used in conjunction with the impeller 12 of the invention. A cylindrical side wall 18 connects the front and back walls 13, 16 of the housing around their peripheries. The side wall 18 includes an upstream outlet 20 and a downstream outlet 22, which are axially spaced and are side-by-side, diverging in a Y-shaped configuration. The housing 11 is of relatively simple construction, and preferably is designed to support a system which operates at a pressure of about 4-5 bars.

The feeder 17 has a feeder inlet 21 for receiving approximately equal amounts of feed into each of the four flights 19. This configuration is particularly useful when a screw conveyor is used which has the same number of flights as there are impeller blades. In this manner, the impeller takes the place of more conventional radial paddles at the discharge of a screw conveyor. In this case, initial splitting occurs when material enters the screw conveyor. Soon thereafter, the impeller directs the split material along two different paths. If unequal feeding is desired, the flights can be unequally spaced at inlet 21. In the preferred embodiment, after a particular flight receives material, the material received therein cannot move to an adjacent flight.

Figure 2:
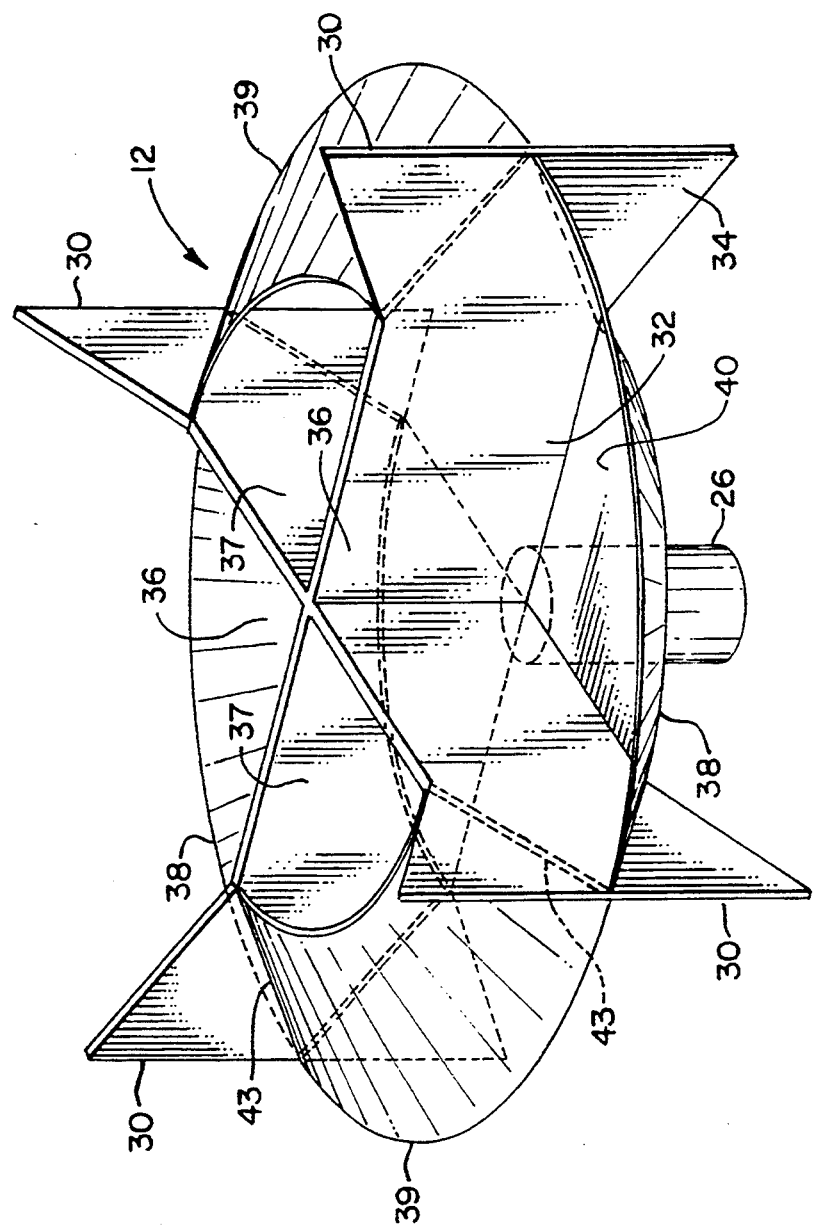
FIG. 2 is a perspective view of the impeller which is contained in the housing shown in FIG. 1.
Figure 3:
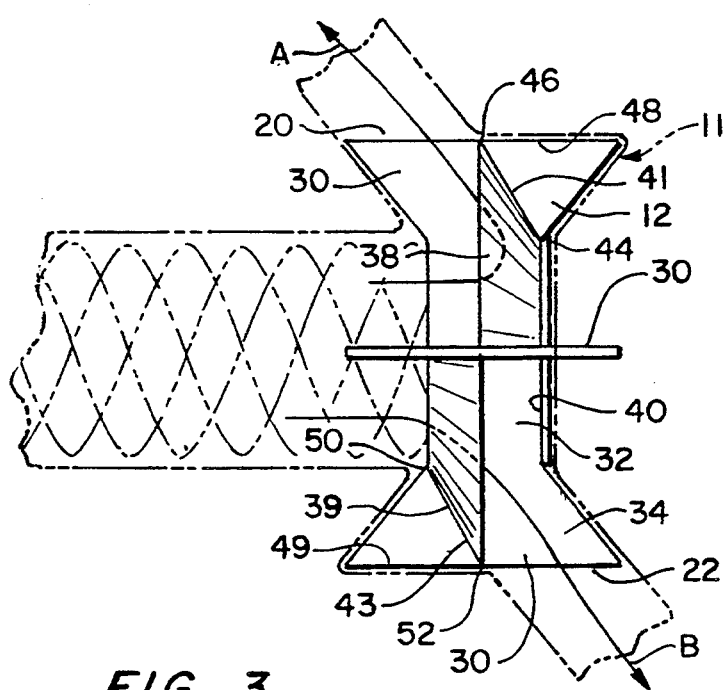
FIG. 3 is a side view of the impeller shown in FIG. 2, with the housing shown in phantom.

The impeller 12, which controls the discharge path of material, is shown in detail in FIGS. 2 and 3. The impeller 12 is driven by a central shaft 26, which is driven by conventional drive means 28, shown in FIG. 1. The shaft 26 preferably is, but need not necessarily be, the same shaft as drives the screw-type feeder 17. The impeller 12 has four thin, radially extending blades 30, each of which forms a right angle with the two adjacent blades. The width of the blades extends in a direction which is parallel to the axis of the shaft. Each blade 30 has an inner portion 32 which is rectangular and extends perpendicularly to the axis, and a co-planar outer portion 34 which diverges obliquely to the axis from the outer end of the rectangular inner portion 32. The diverging outer portion 34 preferably, but not necessarily, is of a substantially trapezoidal shape, with the shorter of the two parallel sides being integrally connected to the outer side of the inner portion 32. The diverging outer portion 34 is configured to direct material alternately upstream and downstream from the inner portion.

The blades 30 define four material receiving chambers of substantially equal size, including a first set of chambers each designated as 36 and a second set of chambers each designated as 37, which receive particulate material from the central inlet 14 in the housing 11. The material receiving chambers 36 are opposite each other and receive material which subsequently is directed out through upstream outlet 20. The material in chambers 36 moves along the path designated by arrows A in FIGS. 3 and 4. Material is removed from chambers 36 when the chambers 36 are individually aligned with outlet 20. The material receiving chambers 37 are opposite each other and receive material which subsequently is directed out through downstream outlet 22 when chambers 37 are individually aligned with outlet 22. Thus, material in chambers 37 moves along a path designated by arrow B in FIGS. 3 and 4. Each of the four flights 19 of the screw feeder 17 is connected to a different blade 30 in order to feed into a single one of the chambers 36, 37.

Thin, frustoconical guide members 38, 39 are positioned in material receiving chambers 36, 37, respectively, and are connected to adjacent blades 30. The guide members reduce the total volume of each material receiving chamber by about 20% relative to the volume of such chambers if the guide members were not present. The guide members assure that material in a particular chamber exits only through one of the housing outlets 20, 22. More specifically, guide members 38 direct material in the material receiving chambers 36, in which they are disposed, outward through upstream outlet 20. Guide members 39 direct material in the material receiving chambers 37 outward through downstream outlet 22.

Guide members 38 also are connected to a circular, flat rear plate 40 of the impeller 12. The plate 40 has a diameter which corresponds to the radial dimension of the inner portion of the blades. The rear plate 40 also acts as a guide in each material receiving chamber for directing flow in the material receiving chambers 36, 37 outward through outlets 20, 22, thereby keeping material in the material receiving chambers 36 from entering into material receiving chambers 37 at a location downstream from the impeller guide members 39. In each chamber 36, 37, the rear plate 40 has a shape which corresponds to a quadrant of a circle or, more generally, the shape of a pie piece.

Figure 4:
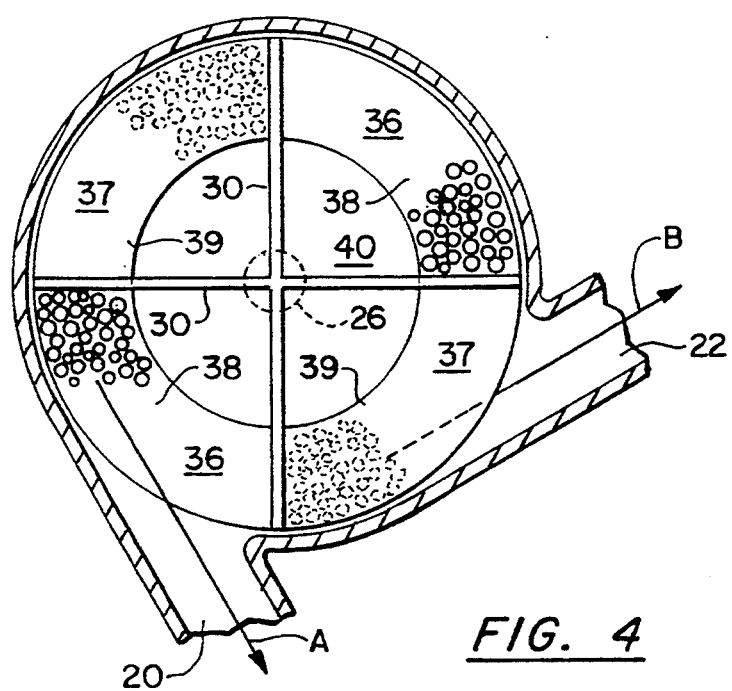
FIG. 4 is a front view of the impeller and housing of FIG. 1 taken from inside the front wall of the housing.

As shown in FIG. 4, the guide members 38, 39, when mounted on the blades, form a circular outer diameter for the impeller when viewed from an upstream position, the outer diameter corresponding to the diameter of the inner surface of the side wall 18 of the housing. In each material receiving chamber 36, 37, the concave side of the frustoconical guide members 38, 39 is the side which is in contact with the particulate material. As shown in FIG. 3, ends 41, 43 of the guide members 38, 39 respectively, are angled at about 45°–60° relative to the axis of the impeller. The downstream end corners 44 of guide members 38 are positioned at the downstream point of intersection between the inner and outer portions 32, 34 of blades 30. The upstream end corners 46 of guide members 38 are positioned at the center of the outermost side 48 of the outer portions of blades 30. The guide members 39 face in an opposite direction, in order that the upstream end corners 50 of guide members 39 are positioned at the upstream point of intersection between the inner and outer portions of blades 30. The downstream end corners 52 of guide members 39 are positioned at the center outermost sides 49 of the outer portions of blades 30. The housing 11 forms walls of the material receiving chambers which are opposite, and generally parallel, to the guide members 38, 39 in order that the material receiving chambers 36, 37 have a bent or angled shape.

The stream splitter 10 of the invention operates in the following manner. Particulate material is chopped or ground prior to being fed into the feeder 17. The chopped material is fed through feeder inlet 21 into feeder 17. Approximately equal amounts of material enter each flight 19 in the feeder 17. Material in feeder 17 is conveyed to the impeller 12 through central inlet 14 of housing 11. At inlet 14, the material from the flights enters the four material receiving chambers 36, 37 of the rotating impeller 12 in a one-to-one relationship, i.e. all of the material from a particular flight 19 enters the same material receiving chamber. The impeller 12 receives material continually by force feeding or, in the event the impeller is disposed horizontally, by gravity feeding through the top, as discussed further below. Typically, the impeller will rotate at a rate of about 200 to 600 revolutions per minute (rpm) and will split a feed stream which has a volume flow rate of about 25 to 150 cu. ft./minute. The stream splitting apparatus can be sized and operated under conditions sufficient to handle a desired capacity. Sizing will depend in part on whether the apparatus is to be used to process fiber or chips. As a result of the rotational speed of the impeller, the material is centrifugally driven to the outer perimeter of the material receiving chambers 36, 37, and as each chamber passes the outlet 20 or 22 to which it is connected, the material exits from the apparatus through outlet 20 or 22.

The embodiment of FIG. 1 is particularly advantageous in that it has a single shaft and is therefore of a simpler design than the double screw feeders which are often used in conjunction with stream splitters.

The apparatus of FIG. 1 can be revised to split the stream into a greater number of separate streams. For example, if the feed screw includes six flights, the impeller includes six chambers, and three outlets are axially spaced from each other, the impeller can be designed such that the material from two opposite chambers is directed to one of three outlets. It is noted that such a revision would require modification of the configuration of the guide members in the impeller 12.

Figure 5:
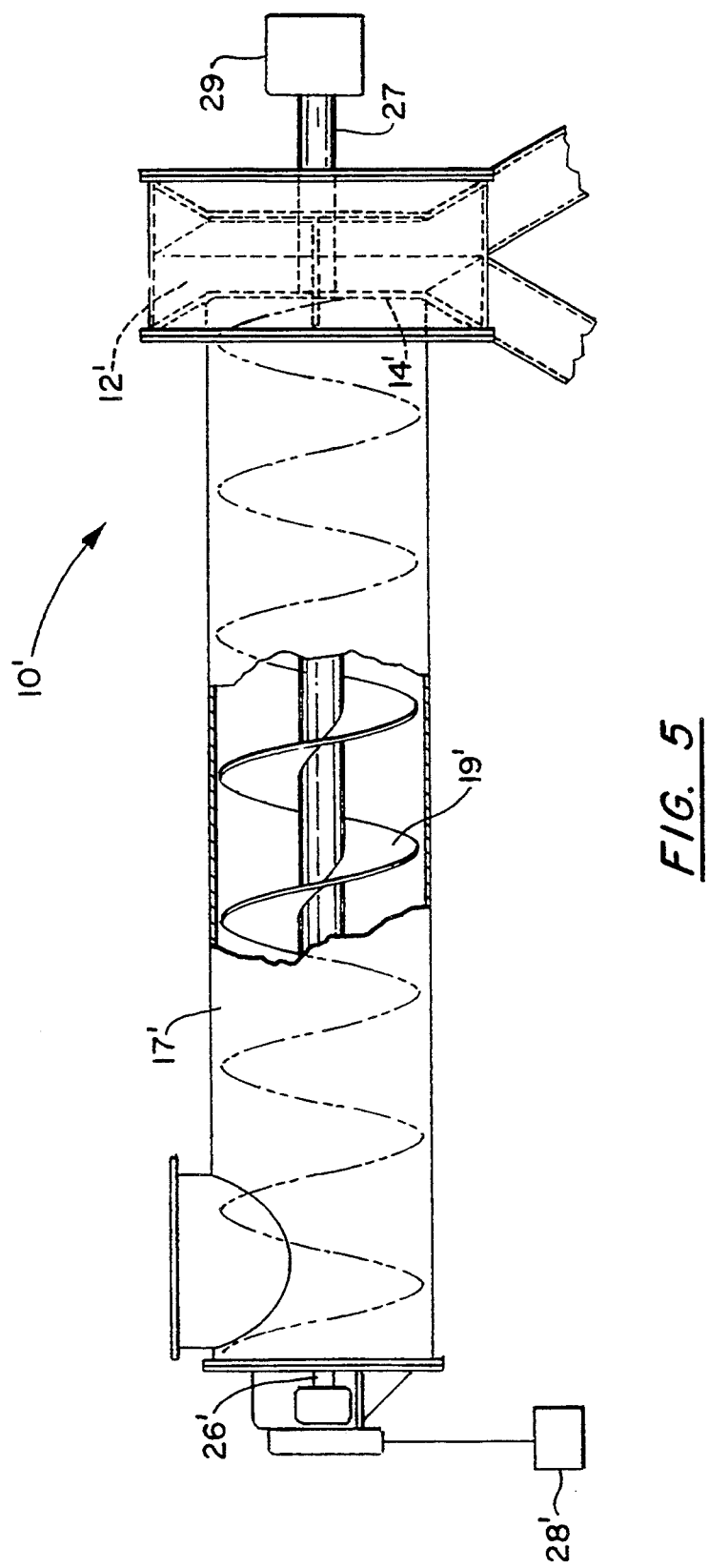
FIG. 5 is a side view of the housing for a second embodiment of a stream splitting apparatus of the invention, showing a single material inlet to a screw-type feeder, two axially spaced material outlets, and showing an impeller in phantom.

In accordance with a second embodiment of the invention shown in FIG. 5, the stream splitter 10' includes a screw-type feeder 17' with a single flight 19' having an exit and which is slightly spaced from, and is not connected to, impeller 12'. Flight 19' is formed on shaft 26', which is driven by drive means 28'. Impeller 12' is mounted on axial shaft 27, which is driven by separate impeller drive means 29. Preferably the impeller 12' is driven at a higher speed than the screw-type feeder 17'. The feed screw flight ends at the central inlet 14' of the impeller 12'.

In the embodiment shown in FIG. 5, the impeller 12' rotates fast enough to provide that, statistically, on an overall basis, each of the chambers receives an equivalent volume of material, at approximately the same flow rate. The requirement for exactly splitting the volume of the inlet stream in a continuous manner is satisfied by the rapid pulse-like switching between two alternating outlets from the apparatus in a pulse-like manner. Whether the central inlet 14' is full, half empty, or only one quarter full, each chamber will receive an overall quantity of material which is substantially identical to that received by each of the adjacent chambers. If there is fluctuation of the incoming flow rate, the split ratio will still be constant because the pulse like switching rate is much faster than typical incoming volume flow fluctuations. Each surge of incoming flow will be chopped into many small equal pieces and sent in two directions. Thus, the flow rate at the impeller inlet can be increased or decreased without effecting the equal splitting of the inlet stream.

Figure 6:
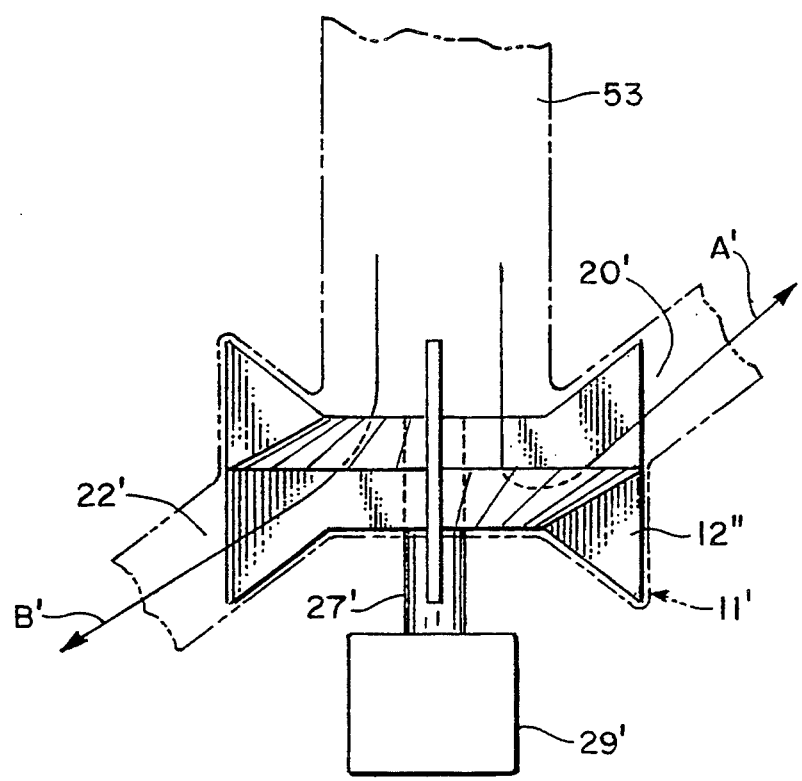
FIG. 6 is a side view of an impeller and vertical feed inlet according to a third embodiment of the invention.

Another embodiment of the invention, which is shown in FIG. 6, involves gravity dropping feed material into a horizontally disposed impeller 12". In this embodiment, no screw-type feeder is needed, and the feed is introduced into the impeller 12" through conduit 53, which provides for downward vertical feed into the impeller 12". The walls of conduit 53 are connected to the impeller housing 11'. The impeller is connected to axial shaft 27', which is driven by impeller drive means 29'. The impeller 12" itself has the same construction as impellers 12 and 12' of the first and second embodiments. Thus, half of the feed material exits through upstream outlet 20', flowing as shown by arrow A' in FIG. 6, and the other half of the material exits through downstream outlet 22', having a flow path indicated by arrow B' in FIG. 6. This embodiment is advantageous in that it dispenses with the need for a screw-type feeder.

Figure 7:
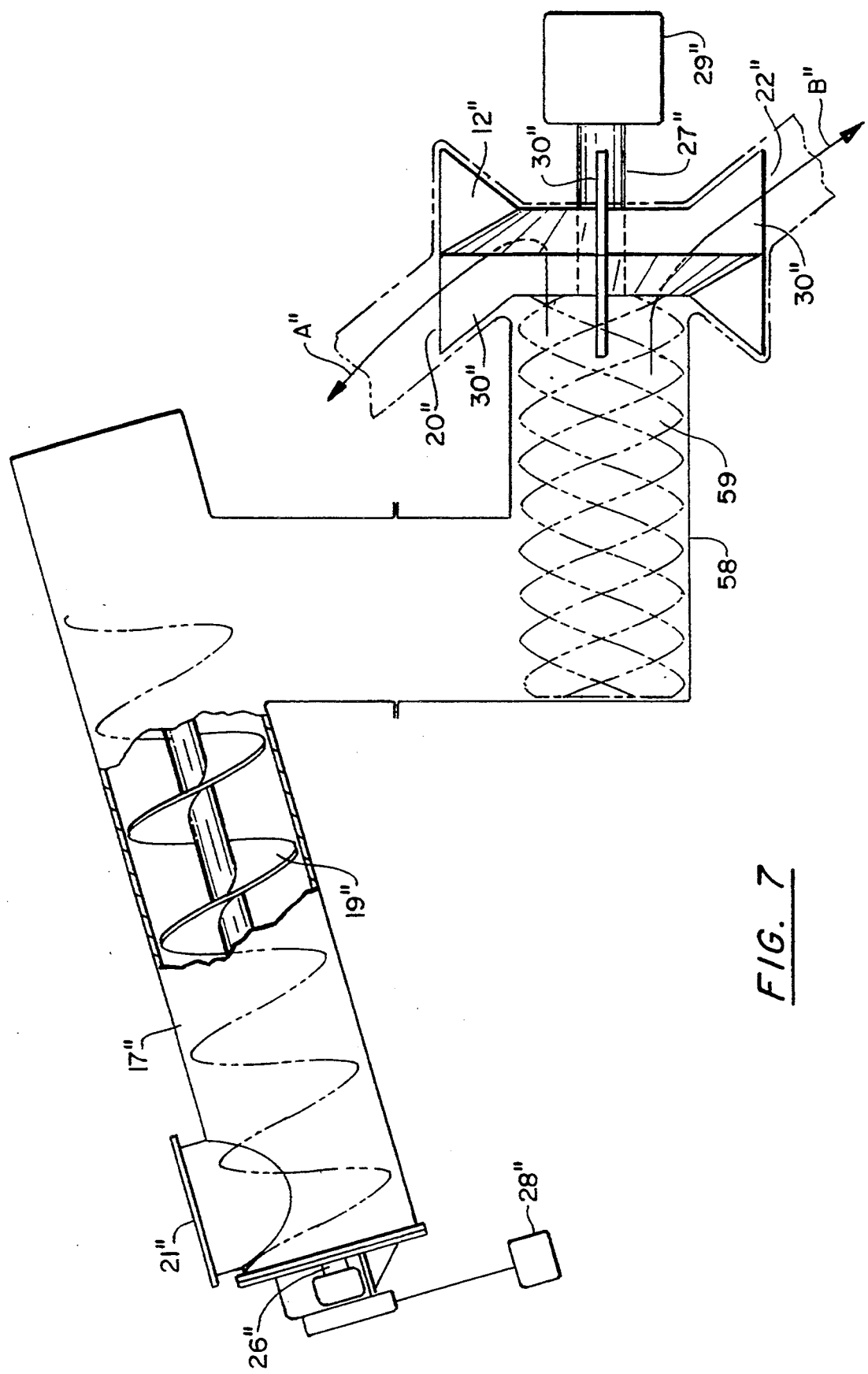
FIG. 7 is a side view of the housing for a fourth embodiment of a stream splitting apparatus of the invention showing a standard cross conveyor connected to a short screw feeder, which in turn is connected to an impeller.

Yet another preferred embodiment of the stream splitting apparatus is shown in FIG. 7. In this embodiment, material is fed into inlet 21" of screw-type feeder 17" having a single flight 19". The flight is connected to shaft 26", which is driven by drive means 28". The material drops vertically from the screw-type feeder 17" at the exit end, and enters a second screw-type feeder 58 having four flights 59. Each flight is welded to one of the blades 30" of an impeller 12"'. Both the screw-type feeder 58 and the impeller 12"' are connected to an axial shaft 27" which is driven by impeller drive means 29". In this embodiment, splitting of the stream occurs at the entrance to screw-type feeder 58. The impeller 12"' has the same configuration as the impellers of the other three embodiments, and includes blades 30". Half of the feed into feeder 58 exits through upstream outlet 20", following a path shown by A", and the other half of the material exits through downstream outlet 22" following a path shown by the arrow designated as B".

In the preferred embodiments of the invention, adjacent material receiving chambers are of equal size. However, it is within the scope of the invention to have adjacent chambers, one of which is larger than the other in order to provide for an unequal split.

While it is preferable to split a stream into two or more streams having equal volume flow rates, it is also within the scope of the invention to alter the size of the chambers, or change the configuration of the guide members in the chambers, such that unequal proportions of the material exit through each of the outlets. For example, if one (but not the other) of the material receiving chambers 36 was altered to be identical to material receiving chamber 37, i.e. such that it includes guide member 39, ¾ of the volume material would then exit through the downstream outlet 22, while only ¼ of the material would exit through the upstream outlet 20.

One of the advantages of the apparatus of the invention is that it is insensitive to downstream pressure fluctuations. The guide members 38, 39 and blades 30 of the present invention prevent material from moving from one material receiving chamber to another after the material has entered the impeller. The only way inter-chamber movement could occur would be if the material were to move upstream from inlet 14 after having entered the impeller 12. Such backflow would not occur even if the downstream pressure of the material entering the impeller is greater than the upstream pressure of the material at the inlet 14, because the centrifugal force of the spinning blades throws the material to the outer portion of the blades with 10 to 150 times gravity.

When it is desirable to split the inlet feed equally into two outlet streams, it is preferable that an even number of chambers be formed and that each chamber have an identical size. However, as is apparent to one having ordinary skill in the art, variation in the number of blades, the number of chambers and chamber sizes is possible.

As will be apparent to persons skilled in the art, various modifications and adaptations of the structure above described will become readily apparent without departure from the spirit and scope of the invention, the scope of which is defined in the appended claims.

I claim:

1. An apparatus for splitting a conveyed stream of material, comprising:
   a stationary housing having a central axis, opposite first and second walls, a side wall, a material inlet formed in the first wall to receive a flow of said stream of conveyed material, and axially spaced first and second material outlets,
   an impeller to fit in the housing, the impeller including a central shaft, a plurality of blades extending radially from the shaft and defining therebetween and with said first and second side walls a first set of material receiving chambers and a second set of material receiving chambers in the housing, the first and second sets of material receiving chambers to receive material at a predetermined ratio of average overall flow rates from the material inlet in the housing, and guide means in each of the plurality of material receiving chambers for guiding material in the first set of material receiving chambers through only the first material outlet and for guiding material in the second set of material receiving chambers through only the second material outlet upon rotation of the impeller, and
   means on the shaft for attachment to a source for rotationally driving the impeller.

2. An apparatus according to claim 1, wherein the first and second sets of material receiving chambers are configured to receive a 1:1 ratio of flow rates of material.

3. An apparatus according to claim 2, wherein each guide means comprises a generally thin, frustoconical segment mounted between adjacent blades.

4. An apparatus according to claim 1, wherein the blades are identical to each other and define at least four material receiving chambers of approximately equal size.

5. An apparatus according to claim 4, wherein the first set of material receiving chambers consists of two non-adjacent material receiving chambers.

6. An apparatus according to claim 1, wherein each guide means comprises a thin, frustoconical segment mounted between adjacent blades.

7. An apparatus according to claim 6, wherein each blade includes a generally rectangular inner portion connected to the shaft and a co-planer trapezoidal outer portion with short and long parallel sides, the short parallel side of the outer portion being connected to the inner portion.

8. An apparatus according to claim 7, wherein each guide means has a pair of opposite terminal edges connected to the outer portions of adjacent blades, the terminal edges extending diagonally relative to the axis of the housing.

9. An apparatus according to claim 1, wherein each blade includes a generally rectangular inner portion connected to the shaft and a co-planer trapezoidal outer portion with short and long parallel sides, the short parallel side of the outer portion being connected to the inner portion.

10. An apparatus according to claim 9, wherein each guide means includes a pie-shaped guide segment opposite to the inlet opening in the housing, the guide segment being part of a flat, circular guide plate which is co-axial with the impeller shaft and abuts both the downstream edge of the inner portion of each blade and the downstream edges of the frustoconical segments in the material receiving chambers which direct material out the upstream outlet, the circular segment having a radius which is approximately equal to the radial dimension of the inner portion of the blades.

11. An apparatus according to claim 1, wherein the guide means in each material receiving chamber directs material to a different outlet than the guide means in any adjacent material receiving chamber.

12. An apparatus according to claim 1, wherein the housing has a shape which is complementary to the impeller.

13. An apparatus according to claim 1, further comprising a screw feeder for feeding material to the impeller.

14. An apparatus according to claim 13, wherein the impeller and screw feeder are mounted to the same shaft.

15. An apparatus according to claim 13, wherein the impeller and screw-feeder are mounted on different shafts.

16. An apparatus according to claim 15, wherein the impeller rotates faster than the screw feeder.

17. An apparatus according to claim 13, wherein the screw feeder has a plurality of flights, each of which is connected to an impeller blade.

18. An apparatus according to claim 1, wherein the impeller is positioned horizontally and the material inlet in the housing is above the impeller.

19. An apparatus according to claim 1, wherein the first material outlet in the housing is upstream from the second material outlet.

20. A method of splitting a stream of material having a variable flow rate into at least two streams having a predetermined ratio of flow rates, comprising:

feeding the material into a stream splitting apparatus which includes a stationary housing with a material-receiving impeller disposed therein, the housing having a central axis, opposite first and second walls, a side wall, a material inlet formed in the first wall, and axially spaced first and second material outlets, the impeller including a rotatably driven central shaft, a plurality of blades extending radially from the shaft defining a first set of material receiving chambers and a second set of material receiving chambers in the housing, the first and second sets of material receiving chambers to receive a predetermined ratio of flow rates of material from the material inlet in the housing, and guide means in the plurality of material receiving chambers for guiding material in the first set of material receiving chambers through the first material outlet and for guiding material in the second set of material receiving chambers through second material outlet upon rotation of the impeller.

21. A method according to claim 20, wherein the step of feeding includes feeding equal overall quantities of material into the first and second sets of material receiving chambers.

22. A method according to claim 20, wherein the step of feeding includes feeding the material into two material receiving chambers in each set.

23. A method according to claim 20, wherein the stream splitting apparatus further includes a screw feeder upstream from the impeller, the screw feeder having a material inlet, and the step of feeding comprises feeding the material into the screw feeder inlet, the screw feeder subsequently feeding the material into the impeller.

* * * * *